(12) United States Patent
Rosén et al.

(10) Patent No.: US 11,629,863 B2
(45) Date of Patent: Apr. 18, 2023

(54) DISTRICT ENERGY DISTRIBUTION SYSTEM AND METHOD OF PROVIDING MECHANICAL WORK AND HEATING HEAT TRANSFER FLUID OF A DISTRICT THERMAL ENERGY CIRCUIT

(71) Applicant: E.ON Sverige AB, Malmö (SE)

(72) Inventors: Per Rosén, Lund (SE); Fredrik Rosenqvist, Helsingborg (SE)

(73) Assignee: E.ON SVERIGE AB, Malmö (SE)

( * ) Notice: Subject to any disclaimer, the term of this patent is extended or adjusted under 35 U.S.C. 154(b) by 565 days.

(21) Appl. No.: 16/608,202

(22) PCT Filed: Apr. 26, 2018

(86) PCT No.: PCT/EP2018/060685
§ 371 (c)(1),
(2) Date: Oct. 25, 2019

(87) PCT Pub. No.: WO2018/202528
PCT Pub. Date: Nov. 8, 2018

(65) Prior Publication Data
US 2020/0096205 A1    Mar. 26, 2020

(30) Foreign Application Priority Data

May 2, 2017    (EP) .................................. 17169074

(51) Int. Cl.
*F24D 10/00* (2022.01)
*F01K 9/00* (2006.01)
(Continued)

(52) U.S. Cl.
CPC ............ *F24D 10/003* (2013.01); *F01K 9/003* (2013.01); *F24D 18/00* (2022.01);
(Continued)

(58) Field of Classification Search
CPC ............... F24D 10/003; F24D 19/1066; F24D 2200/11; F24D 2200/13; F01K 9/003;
(Continued)

(56) References Cited

U.S. PATENT DOCUMENTS 3,757,516 A * 9/1973 McCabe ................. F24T 10/20
165/45
3,986,362 A * 10/1976 Baciu ...................... F24T 10/30
60/659

FOREIGN PATENT DOCUMENTS

EP    1609988 A1 * 12/2005 ............... C09K 5/10
EP    2685174 A1 *  1/2014 ........... F24D 10/003
(Continued)

OTHER PUBLICATIONS

PL-178372-B1, English Language machine translation (Year: 1995).*
(Continued)

*Primary Examiner* — Devon C Kramer
*Assistant Examiner* — Wesley G Harris
(74) *Attorney, Agent, or Firm* — Xsensus LLP

(57) ABSTRACT

A district energy distributing system comprising a geothermal power plant comprising a first and a second circuit. The first circuit comprises a feed conduit for an incoming flow of geothermally heated water from a geothermal heat source; a boiler comprising a heat exchanger configured to exchange heat from the incoming flow of geothermally heated water to superheat a working medium of a second circuit of the geothermal power plant; and a return conduit for a return flow of cooled water from the boiler to the geothermal heat source. The second circuit comprises the boiler configured to superheat the working medium of the second circuit; an expander configured to allow the superheated working medium to expand and to transform the expansion to mechanical work; and a condenser configured to transform
(Continued)

the expanded working medium to liquid phase and to heat a heat transfer fluid of a district thermal energy circuit.

13 Claims, 5 Drawing Sheets

(51) Int. Cl.
*F24D 19/10* (2006.01)
*F24D 18/00* (2022.01)
*F24T 10/20* (2018.01)
*F24D 103/13* (2022.01)
*F24D 101/10* (2022.01)

(52) U.S. Cl.
CPC ...... *F24D 19/1066* (2013.01); *F24D 2101/10* (2022.01); *F24D 2103/13* (2022.01); *F24D 2200/11* (2013.01); *F24D 2200/13* (2013.01); *F24T 10/20* (2018.05)

(58) Field of Classification Search
CPC .... F24H 2240/127; F24T 10/20; Y02B 10/40; Y02B 30/17; Y02E 10/10; Y02E 20/14
See application file for complete search history.

(56) References Cited

FOREIGN PATENT DOCUMENTS

| GB | 2522025 A | 7/2015 | |
|---|---|---|---|
| PL | 178372 B1 * | 9/1995 | ............... F24D 1/00 |
| WO | WO-02090832 A1 * | 11/2002 | ............. F24D 10/00 |
| WO | 2008/102292 A2 | 8/2008 | |
| WO | 2010/145040 A1 | 12/2010 | |
| WO | WO-2010145040 A1 * | 12/2010 | ............. F24D 10/00 |
| WO | 2012/151477 A1 | 11/2012 | |
| WO | WO-2014004061 A2 * | 1/2014 | ............. F01K 23/02 |
| WO | 2016/091969 A1 | 6/2016 | |

OTHER PUBLICATIONS

EP-1609988-A1, English Language Machine Translation (Year: 2005).*
International Search Report and Written Opinion dated Oct. 19, 2018 for PCT/EP2018/060685 filed on Apr. 26, 2018, 16 pages.

* cited by examiner

DISTRICT ENERGY DISTRIBUTION SYSTEM AND METHOD OF PROVIDING MECHANICAL WORK AND HEATING HEAT TRANSFER FLUID OF A DISTRICT THERMAL ENERGY CIRCUIT

CROSS-REFERENCE TO RELATED APPLICATIONS

The present application is based on PCT filing PCT/EP2018/060685, filed Apr. 26, 2018, which claims priority to EP 17169074.6, filed May 2, 2017, the entire contents of each are incorporated herein by reference.

FIELD OF THE INVENTION

The invention relates to a district energy distributing system and a method of providing mechanical work and heating heat transfer fluid of a district thermal energy circuit.

BACKGROUND OF THE INVENTION

Nearly all large developed cities in the world have at least two types of energy grids incorporated in their infrastructures; one grid for providing electrical energy and one grid for providing space heating and hot tap water preparation. A common grid used for providing space heating and hot tap water preparation is a gas grid providing a burnable gas, typically a fossil fuel gas. The gas provided by the gas grid is locally burned for providing space heating and hot tap water. An alternative for the gas grid for providing space heating and hot tap water preparation is a district heating grid. Also the electrical energy of the electrical energy grid may be used for space heating and hot tap water preparation. Also the electrical energy of the electrical energy grid may be used for space cooling. The electrical energy of the electrical energy grid is further used for driving refrigerators and freezers.

Accordingly, traditional building heating and cooling systems use primary high grade energy sources such as electricity and fossil fuels or an energy source in the form of industrial waste heat to provide space heating and/or cooling, and to heat or cool water used in the building. Furthermore, it has been increasingly common to also install a district cooling grid in cities for space cooling. The process of heating or cooling the building spaces and water converts this high grade energy into low grade waste heat with high entropy which leaves the building and is returned to the environment.

It is also well known to use geothermal heat source systems using the heat energy available in the earth to generate e.g. electricity or mechanical work. These kind of systems do however release a large of amount of heat energy which is released by to the ambience by e.g. cooling towers.

Hence, there is a need for an improved and cost-effective system to better use available waste heat.

SUMMARY OF THE INVENTION

It is an object of the present invention to solve at least some of the problems mentioned above.

According to a first aspect, a district energy distributing system is provided. The district energy distributing system comprises a geothermal power plant comprising: a first circuit comprising: a feed conduit for an incoming flow of geothermally heated water from a geothermal heat source; a boiler comprising a heat exchanger configured to exchange heat from the incoming flow of geothermally heated water to superheat a working medium of a second circuit of the geothermal power plant; a return conduit for a return flow of cooled water from the boiler to the geothermal heat source; wherein the second circuit comprises: the boiler configured to superheat the working medium of the second circuit; an expander connected to the boiler and configured to allow the superheated working medium to expand and to transform the expansion to mechanical work; and a condenser configured to transform the expanded working medium to liquid phase and to heat a heat transfer fluid of a district thermal energy circuit; wherein the district thermal energy circuit comprises: a district feed conduit; a district return conduit; a plurality of local heating systems, each having an inlet connected to the district feed conduit and an outlet connected to the district return conduit, wherein each local heating system is configured to provide hot water and/or comfort heating to a building; and the condenser configured to heat heat transfer fluid of the district feed conduit to a temperature of 5-30° C.

The district energy distribution system is configured to combine a geothermal heat source system with a district energy distributing system and with a geothermal power plant. Accordingly, the energy that is extracted from the geothermally heated water may supplied to a plurality of local heating systems which may be used to provide hot water and/or comfort heating to a building. The district energy distribution system can also be used to return energy to the geothermal heat source by the central heat exchanger. Further, the energy that is extracted from the geothermally heated water may be used to generate mechanical work, which e.g. can be used to generate electrical power.

Geothermal energy is in the context of the application to be understood as heat energy that is generated and stored in the earth. Geothermal energy is cost-effective, reliable, sustainable, and environmentally friendly but has historically been limited to areas near tectonic plate boundaries. Recent technological advances have however dramatically expanded the range and size of viable resources, especially for applications such as home heating, opening a potential for widespread exploitation. Developments in drilling allows that geothermal heat source systems can be engineered at depths of up to 5 km or even more. Systems providing access to that kind of depths are often referred to as deep geothermal heat source systems. The inlet and outlet holes to the bedrock are typically arranged at a large distance from each other. Further, the bedrock in the area between the inlet and outlet holes is fractioned allowing water to be stored in the thus formed interspaces. The bedrock as such may be dry, whereby the water is actively supplied via the inlet hole to the bedrock where it is heated. Such formed underground storage is in the following referred to as a geothermal heat source.

By the provided district energy distribution system, a number of advantages are made possible.

The fluctuating temperature in the district energy distribution system in terms of higher temperatures in the summer with low heat load and lower temperatures in the winter with high heat load, results in that the power plant forming part of the system will be able to generate more electricity during the winter, (increased power vs heat ratio), i.e. during the period of high heat load. This provides an advantage over district energy systems were a situation of high load always is followed by a higher delivery temperature of the heat fluid and with a subsequent pressure increase in the condenser which as such results in a lower power vs heat ratio during the winter.

The potential heat power increases substantially (more or less twice) since the condenser operates in the temperature interval of 0-30° C. instead of the typical temperature interval of 45-120° C. which applies to traditional district energy distribution systems. In fact, more electrical power may be generated as compared to a situation where all surplus heat instead would have to be removed as waste heat by using e.g. cooling towers.

The provided district energy distribution system which is configured to control the temperature of the outgoing flow of heat transfer fluid in the district feed conduit to a temperature of 5-30° C. may be seen as a low-temperature system as a difference to typical district energy distribution systems that typically operate in the interval 45-120° C. Thereby a number of advantages are made possible. By way of example, a considerably higher efficiency and amount of heat (up to 3 times) can be gained from an identical geothermal system when the temperature difference increases as a result of the low temperature demands regarding distribution and consumption as compared to traditional district energy distribution systems.

Also, normal geothermal technology provides a working life of about 20-30 years before the heat in the used bedrock has been consumed. The heat is typically considered as being consumed when the delivery temperature in the bedrock has reached the minimum delivery temperature which is deemed acceptable to a district heating system. For the record, the acceptable minimum delivery temperature is typically 80-120° C. for a normal district heating system. By the present district energy distribution system, in combination with inherent fluctuations in temperature between winter and summer, i.e. periods of high heat load and low heat load, the geothermic energy system can be used as a large geothermal storage. More precisely, heat can be transferred to the geothermal heat source during the summer, which is a period of low heat load. Likewise, heat can be extracted during the winter which is a period of high heat load. Thereby the bedrock forming part of the geothermic source can be continued to be used also when the delivery temperature of the heated water is lower than 15-30° C., but then as a season storage. Thus, by the provided district energy distribution system, the otherwise inherent limited working life of a geothermal source does no longer apply.

The geothermal heat source may be a deep geothermal heat source.

The expander may be a gas turbine. As a non-limiting example, the gas turbine may be a steam turbine.

The expander may be configured to allow the superheated working medium to expand to receive an outgoing temperature of 10-40° C.

The boiler may be configured to superheat the liquefied working medium from the condenser.

The geothermal power plant may further comprise a generator configured to transform the mechanical work into electrical power.

The geothermal heat source may be configured to geothermally heat the cooled water returned via the return conduit to a temperature of 100-250° C.

The first circuit may further comprise a suction pump configured to draw geothermally heated water from the geothermal heat source to the feed conduit, and pressurize the geothermally heated water such that it is in liquid phase in the feed conduit.

The boiler may be configured to exchange heat from the incoming flow of geothermally heated water such that the cooled water in the return conduit has a temperature of 10-40° C.

The district feed conduit may together with the district return conduit have a heat transfer coefficient greater than 2.5 W/(mK) when parallel arranged in ground. This value of the heat transfer coefficient is estimated when the local feed and return conduits are parallel arranged within a distance of one meter from each other in ground having an average annual temperature of 8° C. and the arithmetic average temperature of the local feed and return conduits are 8-10° C. By this, thermal heat from the surroundings may be picked up by the local feed conduit and/or the local return conduit. Moreover, cheap un-insulated plastic pipes may be used for the local feed conduit and/or the local return conduit. Moreover, thermal energy of the surroundings may easily be absorbed by the local heat transfer fluid flowing in the local return conduit.

The district feed conduit may be configured to allow heat transfer fluid of a first temperature to flow there through, and wherein the district return conduit may be configured to allow heat transfer fluid of a second temperature to flow there through, wherein the second temperature is lower than the first temperature, and wherein each of the local heating systems may comprise: a thermal energy consumer heat exchanger selectively connected to the district feed conduit via a thermal energy consumer valve for allowing heat transfer fluid from the district feed conduit to flow into the thermal energy consumer heat exchanger, selectively connected to the district feed conduit via a thermal energy consumer pump for pumping heat transfer fluid from the hot conduit into the thermal energy consumer heat exchanger, and connected to the district return conduit for allowing return of heat transfer fluid from the thermal energy consumer heat exchanger to the district return conduit, wherein the thermal energy consumer heat exchanger may be arranged to transfer thermal energy from heat transfer fluid to surroundings of the thermal energy consumer heat exchanger, such that heat transfer fluid returned to the cold conduit has a temperature lower than the first temperature and preferably a temperature equal to the second temperature; a pressure difference determining device configured to determine a local pressure difference, $\Delta p1$, between the district feed conduit and the district return conduit; and a controller configured to, based on the local pressure difference, selectively control the use of either the thermal energy consumer valve or the thermal energy consumer pump.

The wording "selectively connected" should be construed as the heat exchanger concerned is at one point in time in fluid connection either via the pump or via the valve to the respective conduit. Hence, it may be selected if the heat exchanger concerned shall be in fluid connection with the respective conduit via the pump or via the valve.

The wording "valve" should be construed as a device configured to, in a controlled way, allowing heat transfer fluid to flow through the valve when the valve is in an opened state. Moreover, the valve may also be arranged such that the flow rate of heat transfer fluid through the valve may be controlled. Hence, the valve may be a regulation valve arranged for regulating the flow of heat transfer fluid there trough.

The wording "pump" should be construed as a device configured to, in a controlled way, allowing heat transfer fluid to be pumped through the pump when the pump is in an active pumping state. Moreover, the pump may also be arranged such that the flow rate of heat transfer fluid through the pump may be controlled.

The pump and the valve may together be seen as a flow regulator selectively acting as a pump or as a valve. The wording "selectively act as a pump or a valve" should be construed as the flow controller is at one point in time acting as a pump and at another point in time acting as a valve. Such a flow regulator is described in the patent application EP16205021.5.

The district thermal energy distribution system allows for the local pressure difference between heat transfer fluid of the district feed conduits and the district return conduits, i.e. the hot and cold conduits to vary along the thermal energy circuit. Especially, the local pressure difference between heat transfer fluid of the district feed conduits and district return conduits may vary from positive to negative pressure difference seen from one of the conduits. The district thermal energy distribution system further allows for the possibility to let all the pumping within the system to take place in the local thermal energy consumer/generator assemblies. Due to the limited flows and pressures needed small frequency controlled circulation pumps may be used. Hence, an easy to build district thermal energy distribution system is provided. Further a district thermal energy distribution system that is easy to control is provided.

The basic idea of the district thermal energy distribution system is based on the insight by the inventors that modern day cities by them self-provided thermal energy that may be reused within the city. The reused thermal energy may be picked up by the district thermal energy distribution system and be used for e.g. space heating or hot tap water preparation. Moreover, increasing demand for space cooling will also be handled within the district thermal energy distribution system. Within the district thermal energy distribution system buildings within the city are interconnected and may in an easy and simple way redistribute low temperature waste energy for different local demands. Amongst other the district thermal energy distribution system will provide for:
  Minimizing the use of primary energy due to optimal re-use of energy flows inside the city.
  Limiting the need for chimneys or firing places inside the city, since the need for locally burning gas or other fuels will be reduced.
  Limiting the need for cooling towers or cooling convectors inside the city, since excess heat produced by cooling devices may be transported away and reused within the district thermal energy distribution system.

Hence, the district thermal energy distribution system using geothermal energy provides for a smart duel use of thermal energy within a city. When integrated into a city the district thermal energy distribution system provides make use of low level thermal energy waste in both heating and cooling applications within the city. This will reduce the primary energy consumption of a city by eliminating the need for a gas grid or a district heating grid and a cooling grid in city.

The controller may be configured to selectively use the thermal energy consumer valve when the local pressure difference indicates that a local pressure of the heat transfer fluid of the district feed conduit is larger than a local pressure of the heat transfer fluid of the district return conduit, wherein the controller may be configured to selectively use the thermal energy consumer pump when the first local pressure difference indicates that the first local pressure of the heat transfer fluid of the district feed conduit is lower than or equal to the first local pressure of the heat transfer fluid of the district return conduit.

Each of the plurality of local heating systems may be configured to extract heat from heat transfer fluid entering the local heating system via the inlet and return the thereafter cooled heat transfer fluid to the district return conduit via the outlet, wherein each of the plurality of local heating systems may be configured to return local heat transfer fluid having a temperature in the range of −5-15° C. By conducting local heat transfer fluid having a temperature in this temperature range, heat loss to the surroundings may be reduced. Moreover, thermal energy of the surroundings may even be absorbed by the local heat transfer fluid flowing in the local return conduit. The surroundings of the district return conduit is typically ground since the district return and feed conduits typically are arranged in the ground along the majority of their paths.

The district feed conduit and district return conduit may be dimensioned for pressures up to 0.6 MPa, 1 MPa, or 1.6 MPa.

The boiler may comprise a plurality of heat exchangers connected in series in the first and second circuits. As seen in the flow direction of the first circuit, the boiler may comprise a superheater, a boiler and an economizer. The flows in the first and second circuits pass the boiler as two counter flows.

The feed conduit may be configured to allow heat transfer fluid of a first temperature to flow there through, and the return conduit may be configured to allow heat transfer fluid of a second temperature to flow there through, wherein the second temperature may be lower than the first temperature.

The first and second local pressure differences may be set to be at most ±0.2 MPa, ±0.3 MPa or ±0.6 MPa depending on chosen dimensioning pressure.

The temperature difference between the temperatures of the district feed conduit and the district return conduit may be in the range of 5-16° C., preferably in the range of 7-12° C., more preferably 8-10° C.

According to another aspect, a method of providing mechanical work and of heating heat transfer fluid of a district thermal energy circuit is provided. The method comprises: supplying to a boiler which is connected to a geothermal heat source, a flow of geothermally heated water from the geothermal heat source; exchanging, by a heat exchanger of the boiler, heat from the incoming flow of geothermally heated water to superheat a working medium; expanding, in an expander, the superheated working medium providing mechanical work; and transforming, at a condenser, the expanded working medium to liquid phase by heating a heat transfer fluid of a district feed conduit in the district thermal energy circuit to a temperature of 5-30° C.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

These and other aspects of the present invention will now be described in more detail, with reference to the appended drawings showing embodiments of the invention. The figures are provided to illustrate the general structures of embodiments of the present invention. Like reference numerals refer to like elements throughout.

DETAILED DESCRIPTION

Figure 1:
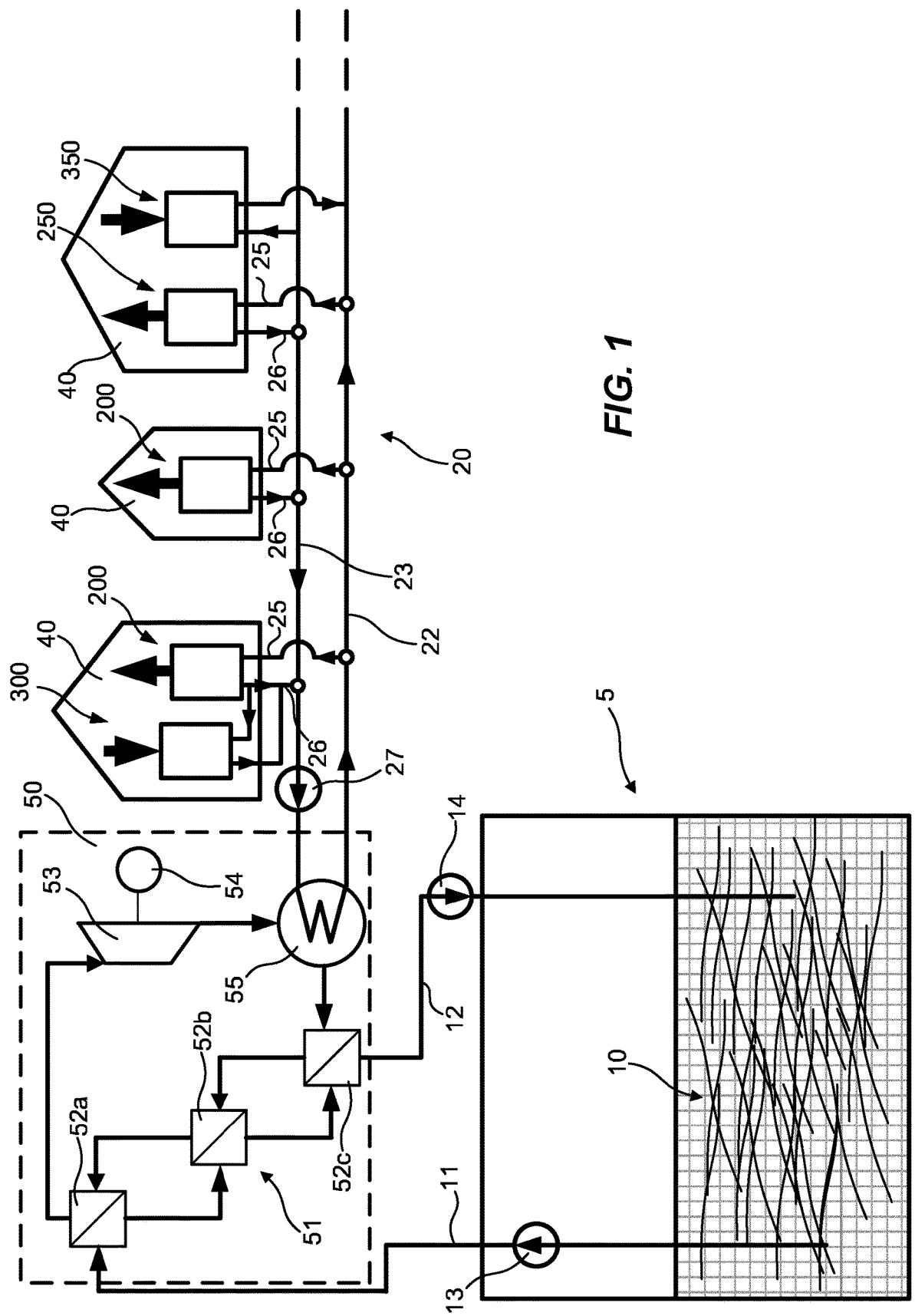
FIG. 1 is a schematic diagram of an energy distribution system.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

In connection with FIG. 1 an energy distribution system will be discussed. The energy distribution system comprises a geothermal energy plant 50 having a first and a second circuit which are interconnected via a boiler 51. The flows of the first and second circuits are arranged as two counter flows past the boiler 51. The first circuit is connected to a geothermal heat source system 5 and the second circuit is connected to a district thermal energy circuit 20.

Starting with the geothermal heat source system 5, this comprises a geothermal heat source 10. The geothermal heat source 10 communicates with the first circuit of the geothermal energy plant 50 via a feed conduit 11 and a return conduit 12. To facilitate the circulating flow, the feed conduit 11 comprises a suction pump 13 which sucks heated water from the bedrock into the first circuit. The suction pump 13 is configured to draw geothermally heated water from the geothermal heat source 10 to the feed conduit 11 and pressurize the geothermally heated water such that it is in liquid phase in the feed conduit 11.

The return conduit 12 comprises a pump 14 which forces the cold water from the first circuit back into the geothermal heat source 10. The geothermal heat source 10 may be configured to geothermally heat the cooled water which is returned via the return conduit 12 to a temperature of 100-250° C.

The geothermal heat source system 5 may be a deep geothermal heat source system. A deep geothermal heat source system is to be understood as a system providing access to depths more than 3 km, preferably more than 5 km.

As given above, the geothermal energy plant 50 comprises a first and a second circuit which are interconnected by a boiler 51. Starting with the first circuit, this comprises the feed conduit 11 for the incoming flow of geothermally heated water from the geothermal heat source 10 to the boiler 51. The boiler 51 forms a heat exchanger which is, in FIG. 1 shown embodiment, divided into three units connected in series—a superheater 52a, a boiler 52b and an economizer 52c. The boiler 51 is configured to exchange heat from the incoming flow of geothermally heated water in the first circuit such that the cooled water which is returned from the boiler 51 to the geothermal heat source 10 via the return conduit 12 has a temperature of 10-40° C. In the in FIG. 1 shown embodiment the boiler comprises three different heat exchanger units 52a, 52b, 52c, however, it is realized that any number of heat exchanger units may be used fitting the particular set-up of the boiler 52.

Now turning to the second circuit of the geothermal energy plant 50, the second circuit comprises the boiler 51, an expander 53 connected to the boiler 51, and a condenser 55.

The boiler 51 with its exchanger units 52a, 52b, 52c is configured to exchange heat from the incoming flow of geothermally heated water in the first circuit to thereby superheat a working medium of the second circuit of the geothermal power plant 50. The working medium of the second circuit may by way of example be water, ammonia, oils or propane.

The expander 53 which is connected to the boiler 51 is configured to allow the superheated working medium to expand and to transform the expansion into mechanical work. The expander 53 may be a turbine, such as a gas turbine. Alternatively, the expander 53 may be a Sterling motor. The expander 53 may be configured to allow the superheated working medium to expand to receive an outgoing temperature of 10-40° C.

The expander 53 may be connected to a generator 54, whereby the mechanical work provided by the expander 53 may be transformed to electrical power. The electrical power may be supplied to the electrical grid (not shown), which as such is well known in the art.

The condenser 55 is configured to transform the expanded working medium of the second circuit to liquid phase. The condenser 55 is also configured to heat a heat transfer fluid of the district thermal energy circuit 20.

As indicted above, the flows of the first and second circuits are arranged as two counter flows past the boiler 51. In the first circuit, the flow of hot water from the feed conduit 11 passes the boiler 51 by passing the heat exchanger unit(s), e.g. the superheater 52a, the boiler 52b and the economizer 52c, of the boiler 51 before being returned as cooled water to the geothermal heat source system 5 via the return conduit 12. Likewise, in the second circuit, the flow of cooled, liquidized working medium delivered from the condenser 55 is arranged to pass the boiler 51 towards the expander 53 via the heat exchanger unit(s), e.g. the economizer 52c, the boiler 52b and then the superheater 52a, of the boiler 51. Accordingly, the boiler 51 can be seen as a heat exchanger.

The second circuit of the geothermal energy plant 50 is connected to the district thermal energy circuit 20 via the condenser 55.

The district thermal energy circuit 20 comprises a district feed conduit 22 and a district return conduit 23. The district feed conduit 22 is connected to an outlet of the condenser 55 and the district return conduit 23 is connected to an outlet of the condenser 55. The district thermal energy circuit 20 is configured to deliver heat transfer fluid to local heating systems 200, 250 and/or local cooling systems 300, 350 which are arranged in buildings 40. The buildings may be residential homes but it may also be other types of buildings 40 such as office buildings, business premises and factories in need for heating and/or cooling. It is to be understood that the district thermal energy circuit may comprise a plurality of local heating systems 200, 250 and/or local cooling systems 300, 350.

The condenser 55 configured to exchange heat from an, via the district feed circuit 22, incoming flow of heat transfer fluid to an outgoing flow of heat transfer fluid in the district feed conduit 22. The condenser 55 is configured to exchange heat such that the outgoing flow of heat transfer fluid has a temperature of 5-30° C. Further, the condenser 55 may be configured to exchange heat such that the district heat transfer fluid returned to the district return conduit 23 is having a temperature of 5-10° C. By returning heat transfer fluid of this low temperature, the cooling performed in the condenser 55 can be as great as approximately 100° C. (depending of the temperature of the incoming heat transfer fluid feed through the district feed conduit 22). This high degree of cooling performed in the condenser 55 will reduce the heat losses in the district heating grid. Moreover, it will reduce the degree of pumping needed in the district heating grid.

The piping used for the district feed and return conduits 22, 23 in the district thermal energy circuit 20 is normally plastic un-insulated piping. In this context un-insulated shall be construed such that the piping does not have an extra layer of heat insulating material wrapped around the same. The piping is typically designed for a maximum pressure of 0.6-1 MPa. The piping is further typically designed for maximum temperature of about 50° C. Further, the district feed and return conduits 22, 23 in the district thermal energy circuit 20 may together have a heat transfer coefficient greater than 2.5 W/(mK) when parallel arranged in ground. As mentioned above, this value of the heat transfer coefficient is estimated when the district feed and return conduits 22, 23 are parallel arranged within a distance of one meter from each other in ground having an average annual temperature of 8° C. and the arithmetic average temperature of the local feed and return conduits are 8-10° C.

The heat transfer fluid, and hence energy carrier, is typically water, although it is to be understood that other fluids or mixture of fluids may be used. Some non-limiting examples are ammonia, anti-freezing liquids (such as glycol), oils and alcohols. A non-limiting example of a mixture is water with an anti-freezing agent, such as glycol, added thereto. According to a preferred embodiment the heat transfer fluid is a mixture of water and an anti-freezing agent, such as glycol. This will allow for the heat transfer fluid to have temperatures below 0° C. Providing a heat transfer fluid having freezing point below 0° C., preferably below -5° C., makes it possible to conduct heat transfer fluid in the district return conduit 23 that may absorb heat from the surroundings, e.g. the ground surrounding the district return conduit 23, even if the surroundings have a temperature close to 0° C.

Figure 2:
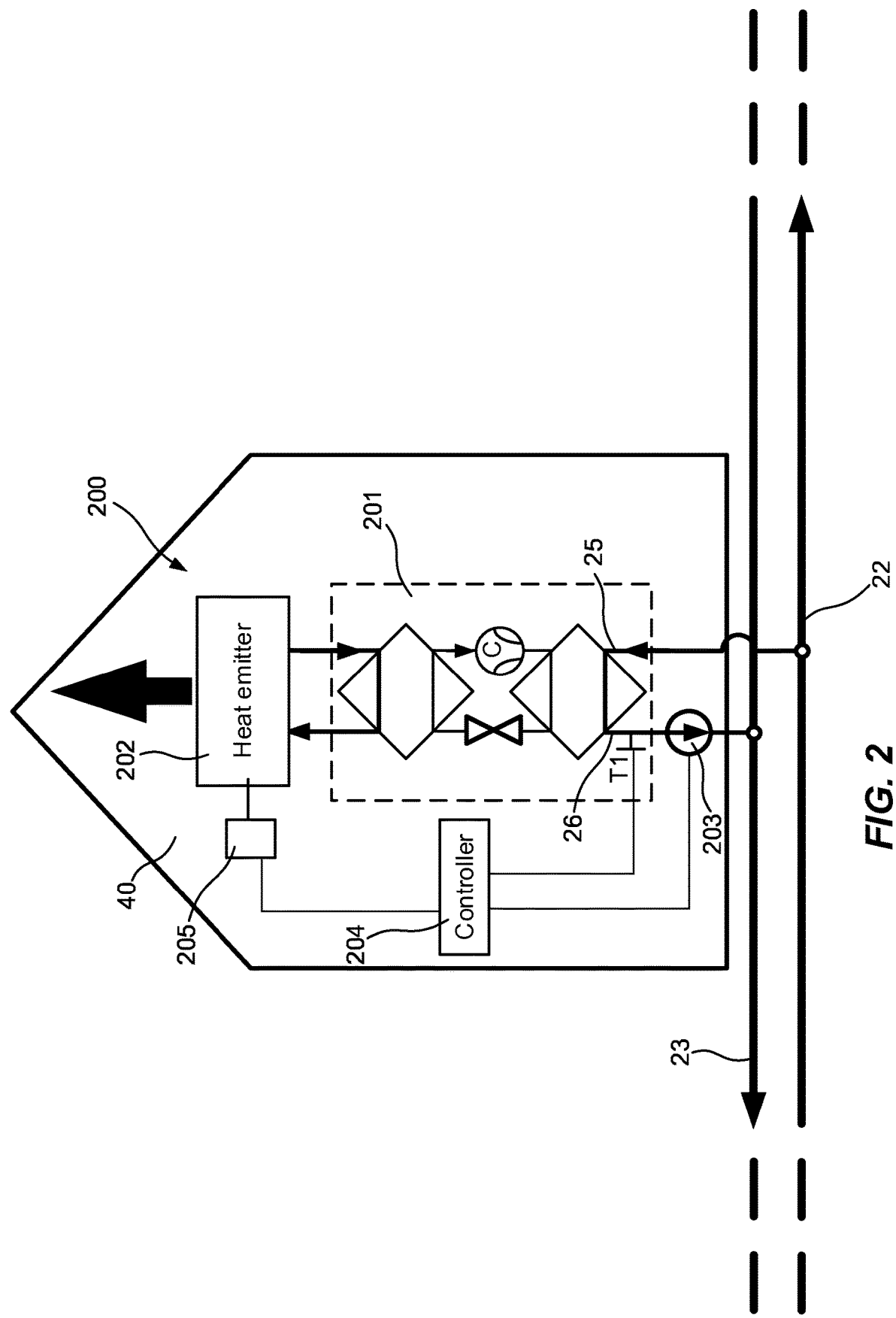
FIG. 2 is a schematic diagram of a local heating system.

Now with reference to FIG. 2, a local heating system 200 will be discussed in more detail. The district thermal energy circuit 20 may comprise one or more local heating systems 200 of this type.

The local heating system 200 comprises a heat pump 201 and a heat emitter 202. The heat emitter 202 is connected to the local energy distributing grid 20a via the heat pump 202. The local heating system 200 is configured to, via the heat emitter 202 and the local heat pump 201, provide hot tap water and/or comfort heating to a respective building 40. The local heat pump 201 has an inlet 25 connected to the district feed conduit 22 and an outlet 26 connected to the district return conduit 23. In this context the term "inlet of the heat pump" is to be interpreted as the inlet via which the heat pump is fed with local heat transfer fluid from the district thermal energy circuit 20. Likewise, the term "outlet of the heat pump" is to be interpreted as the outlet via which the heat pump returns local heat transfer fluid to the district thermal energy circuit 20.

Heat pumps as such, are well known in the art and basically comprises a closed circuit in which brine is circulated between a first heat exchanger and a second heat exchanger. The first heat exchanger has an inlet and an outlet, in this case the inlet 25 and the outlet 26 of the local heat pump 201, via which the local heat pump 201 is connected to a first circuit circulating a flow of a first fluid, in this case the heat transfer fluid of the district thermal energy circuit 20. Likewise, the second heat exchanger has an inlet and an outlet via which the local heat pump 201 is connected to a second circuit circulating a flow of a second fluid, in this case a heating fluid of the heat emitter 202. The heating fluid of the heat emitter 202 is typically water, although it is to be understood that other fluids or mixture of fluids may be used. Some non-limiting examples are ammonia, anti-freezing liquids (such as glycol), oils and alcohols. A non-limiting example of a mixture is water with an anti-freezing agent, such as glycol, added thereto.

Since the flow of heat transfer fluid in the district feed conduit 22 is having a temperature of 5-30° C. the input temperature to the local heat pump 201 is in the same temperature range. The local heating system 200 is configured to extract heat from heat transfer fluid entering the local heat pump 201 via the inlet 25 and return heat transfer fluid to the district return conduit 23 via the outlet 26. The local heating system 200 is configured to return local heat transfer fluid having a temperature being in the range of -5-15° C.

The local heating system 200 may further comprises a local circulation pump 203. In the in FIG. 2 shown embodiment the local circulation pump 203 is arranged in the outlet 26 of the local heat pump 24. However, the local circulation pump 28 may alternatively be arranged in the inlet 25 of the local heat pump 201. Hence, the local circulation pump 203 is connected between the inlet 25 and the outlet 26 of the local heating system 200. The local circulation pump 203 is configured to circulate heat transfer fluid in the district feed conduit 22 and the district return conduit 23. The local circulation pump 203 is configured to overcome the pressure difference between the district return conduit 23 and the district feed conduit 22. The local circulation pump 203 is further configured to regulate the flow of heat transfer fluid flowing through the local heat pump 201. By regulating the flow of cooling fluid trough the local heat pump 201, and at the same time optionally control the operation of the local heat pump 201, the temperature of the local heat transfer fluid outputted from the local heat pump 201 may be controlled.

Hence, some or all of the plurality of local heating systems 200 of the district thermal energy system 20 may comprise a local circulation pump 203 for circulating heat transfer fluid in the district feed conduit 22 and in the district return conduit 23. Additionally, or in combination with the plurality of local circulation pumps 203, the district thermal energy circuit 20 may comprise a central circulation pump 27 configured to circulate the fluid in the district feed and return conduits 22, 23. The central circulation pump 27 is best seen in FIG. 1.

The local heat pump 201 may be controlled by a controller 204. The controller 204 may control the local heat pump 201 based on data pertaining to heating demands of the heat emitter 202 and/or data pertaining to the temperature of the heat transfer fluid in the outlet 26 of the local heat pump 201. Data pertaining to heating demands of the heat emitter 202 may be determined by means of a heat demand sensor 205 connected to the heat emitter 202. Data pertaining to the temperature of the local heat transfer fluid in the outlet 26 of the heat pump 201 may be determined by means of a temperature sensor T1 connected to the outlet 26.

Now with reference to FIG. 3, a local cooling system 300 will be discussed in more detail. The district thermal energy circuit 20 may comprise one or more local heating systems 300.

It shall be noted that the local cooling system 300 is arranged in connection with a local heating system 200. The local heating system 200 is a local heating system of the type that has been discussed above with reference to FIG. 2. In order to avoid undue repetition with regard to the local heating system 200 reference is made to the above.

Each local cooling system 300 comprises a cooler 301 and a cooling heat exchanger 302. Coolers 301 are as such well known in the art and may be used e.g. for comfort cooling in buildings such as office buildings, business premises, residential homes and factories in need for cooling. The cooler 301 is connected to the district thermal energy circuit 20 via the cooling heat exchanger 302. The local cooling system 300 is configured to, via the cooler 301 and the cooling heat exchanger 302, provide comfort cooling to a respective building 40. Hence, the local cooling system 300 is configured to extract heat from a building 40.

The cooling heat exchanger 302 has an inlet 303 connected to the outlet 26 of one of the plurality of local heating systems 200. The cooling heat exchanger 302 further has an outlet 304 connected to the district return conduit 23 of the district thermal energy circuit 20. In this context the term "inlet of the heat exchanger" is to be interpreted as the inlet via which the heat exchanger is fed with local heat transfer fluid from the district thermal energy circuit 20. Likewise, the term "outlet of the heat exchanger" is to be interpreted as the outlet via which the heat exchanger returns local heat transfer fluid to the district thermal energy circuit 20.

As mentioned above, the cooler 301 is connected to the district thermal energy circuit 20 via the cooling heat exchanger 302. With reference to the above, heat exchangers as such are well known in the art and can basically be described as comprising an arrangement of a first closed circuit circulating a first fluid having a first temperature, and a second closed circuit circulating a second fluid having a second temperature. By the two circuits along an extension closely abutting each other a heat transfer takes place between the two fluids. In the local cooling system 300, the first circuit is locally arranged in the building 40 and the second circuit forms part of the district thermal energy circuit 20. Coolers to be used for local cooling systems of buildings are typically situated in air ducts of ventilation or distributed through fan-driven air-coil collectors or ceiling mounted cooling batteries in individual spaces of a building.

The local cooling system 300 may further comprise a flow valve 305. The flow valve 305 is configured to regulate the flow of local heat transfer fluid flowing through the cooling heat exchanger 302. By regulating the flow of heat transfer fluid trough the cooling heat exchanger 302, and at the same time optionally control the operation of the cooling heat exchanger 302, the temperature of the local heat transfer fluid outputted from the cooling heat exchanger 302 may be controlled. The flow valve 305 may be controlled by a second controller 306. The second controller 306 may control the flow valve 305 based on data pertaining to cooling demands of the cooler 301 and/or data pertaining to the temperature of the local heat transfer fluid in the outlet 26 of the local heating system 200 and/or data pertaining to the temperature of the local heat transfer fluid in the outlet 304 of the local cooling system 300. Data pertaining to cooling demands of the cooler 301 may be determined by means of a cooling demand sensor 307 connected to the cooler 301. Data pertaining to the temperature of the heat transfer fluid in the outlet 304 of the local heating system 200 may be determined by means of the temperature sensor T1 discussed above. Data pertaining to the temperature of the local heat transfer fluid in the outlet 304 of the local cooling system 300 may be determined by means of a temperature sensor T2 connected to the outlet 304.

Now turning anew to FIG. 1, the district thermal energy circuit 20 may further comprise a local heating system 250 and/or a local cooling system 350.

The district thermal energy circuit 20 may comprise one or more local heating systems 250 and/or one or more local cooling systems 350. The local heating system 250 may be arranged in a building 40. The local cooling system 350 may be arranged in a building 40. The local heating system 250 is connected to the district feed conduit 22 via an inlet 25 and connected to the district feed conduit 23 via an outlet 26. The local cooling system 350 is connected to the district return conduit 23 via an inlet 25 and connected to the district feed conduit 22 via an outlet 26.

Now turning to FIG. 4, the local heating system 250 will be discussed. The local heating system 250 can be seen as a thermal energy consumer assembly. The district thermal energy circuit 20 may comprise one or more thermal energy consumer assemblies.

The local heating system 250 comprises a thermal energy consumer heat exchanger 251, a thermal energy consumer valve 252, a thermal energy consumer pump 253, a first pressure difference determining device 254 and a first controller 255.

The thermal energy consumer heat exchanger 251 is selectively connected to the district feed conduit 22, being a hot conduit, via the thermal energy consumer valve 252 and the thermal energy consumer pump 253. Upon selecting the connection of the thermal energy consumer heat exchanger 251 to the district feed conduit 22 to be via the thermal energy consumer valve 252, heat transfer fluid from the district feed conduit 22 is allowed to flow into the thermal energy consumer heat exchanger 251. Upon selecting the connection of the thermal energy consumer heat exchanger 251 to the district feed conduit 22 to be via the thermal energy consumer pump 253, heat transfer fluid from the district feed conduit 22 is pumped into the thermal energy consumer heat exchanger 251. As will be discussed more in detail below, the choice of allowing heat transfer fluid from the district feed conduit 22 to flow into the thermal energy consumer heat exchanger 251 or pumping heat transfer fluid from the district feed conduit 22 into the thermal energy consumer heat exchanger 251, is made based on a local pressure difference between the district feed conduit 22 and the district return conduit 23.

The thermal energy consumer valve 252 and the thermal energy consumer pump 253 may be arranged as separate devices. The thermal energy consumer valve 252 and the thermal energy consumer pump 253 may be arranged as a single device, in the summary section referred to as a flow regulator. The thermal energy consumer valve 252 and the thermal energy consumer pump 253 may be arranged in parallel, as illustrated in FIG. 4. The thermal energy consumer valve 252 and the thermal energy consumer pump 253 may be arranged in series. In this last embodiment wherein the thermal energy consumer valve 252 and the thermal energy consumer pump 253 is arranged in series the pump is arranged to be set in an inactive state allowing a flow of heat transfer fluid there through.

The thermal energy consumer heat exchanger 251 is further connected to the district return conduit 23, being a cold conduit, for allowing return of heat transfer fluid from the thermal energy consumer heat exchanger 251 to the district return conduit 23.

The first pressure difference determining device 254 is adapted to determine a first local pressure difference, $\Delta p_1$, of the district thermal energy circuit 20. The first local pressure difference is preferably measured in the vicinity to where the thermal energy consumer heat exchanger 251 is connected to the district thermal energy circuit 20. The first pressure difference determining device 254 may comprises a first hot conduit pressure determining device 254a and a first cold conduit pressure determining device 254b. The first hot conduit pressure determining device is arranged to be connected to the district feed conduit 22 for measuring a first local pressure of the heat transfer fluid of the district feed conduit 22. The first cold conduit pressure determining device is arranged to be connected to the district return conduit 23 for measuring a first local pressure of the heat transfer fluid of the district return conduit 23. The first local pressure difference device 254 is arranged to determine the first local pressure difference as a pressure difference between the first local pressure of the heat transfer fluid of the district feed conduit 22 and the first local pressure of the heat transfer fluid of the district return conduit 23. Hence, the first local pressure difference may be defined as a local pressure difference between a first local pressure of the heat transfer fluid of the district feed conduit 22 and a first local pressure of the heat transfer fluid of the district return conduit 23. Preferably, the first local pressure of the heat transfer fluid of the district feed conduit 22 is measured in the vicinity to where the thermal energy consumer heat exchanger 251 is connected to the district feed conduit 22. Preferably, the first local pressure of the heat transfer fluid of the district return conduit 23 is measured in the vicinity to where the thermal energy consumer heat exchanger 251 is connected to the district return conduit 23.

The first pressure difference determining device 254 may be implemented as a hardware device, a software device, or as a combination thereof. The first pressure difference determining device 254 is arranged to communicate the first local pressure difference, $\Delta p_1$, to the first controller 255.

The first controller 255 may be implemented as a hardware controller, a software controller, or as a combination thereof. The first controller 255 is arranged to selectively control the use of either the thermal energy consumer valve 252 or the thermal energy consumer pump 253. The first controller 255 is arranged to perform the selective control based on the first local pressure difference provided by the first pressure difference determining device 254. The first controller 255 is arranged to communicate with the thermal energy consumer valve 252 and the thermal energy consumer pump 253 for controlling the thermal energy consumer valve 252 and the thermal energy consumer pump 253. The first controller 255 is arranged to selectively control the use of the thermal energy consumer valve 252 when the first local pressure difference indicates that the first local pressure of the heat transfer fluid of the district feed conduit 22 is larger than the first local pressure of the heat transfer fluid of the district return conduit 23. The first controller 255 is arranged to selectively control the use of the thermal energy consumer pump 253 when the first local pressure difference indicates that the first local pressure of the heat transfer fluid of the district feed conduit 22 is lower than or equal to the first local pressure of the heat transfer fluid of the district return conduit 23.

The thermal energy consumer heat exchanger 251 is arranged to transfer thermal energy from heat transfer fluid to surroundings of the thermal energy consumer heat exchanger 251. The heat transfer fluid returned to the district return conduit 23 has a temperature lower than the first temperature. Preferably, thermal energy consumer heat exchanger 251 is controlled such that the temperature of the heat transfer fluid returned to the district return conduit 23 is equal to the second temperature.

Again turning to FIG. 4, the local cooling system 350 will be discussed. The local cooling system 350 can be seen as a thermal energy generator assembly. The district thermal energy circuit 20 may comprise one or more thermal energy generator assemblies.

The local cooling system 350 comprises a thermal energy generator heat exchanger 351, a thermal energy generator valve 252, a thermal energy generator pump 353, a second pressure difference determining device 354, and a second controller 355.

The thermal energy generator heat exchanger 351 is selectively connected to the district return conduit 23 via the thermal energy generator valve 352 and the thermal energy generator pump 353. Upon selecting the connection of the thermal energy generator heat exchanger 351 to the district return conduit 23 to be via the thermal energy generator valve 352, heat transfer fluid from the district return conduit 23 is allowed to flow into the thermal energy generator heat exchanger 351. Upon selecting the connection of the thermal energy generator heat exchanger 351 to the district return conduit 23 to be via the thermal energy generator pump 353, heat transfer fluid from the district return conduit 23 is pumped into the thermal energy generator heat exchanger 351. As will be discussed more in detail below, the choice of allowing heat transfer fluid from the district return conduit 23 to flow into the thermal energy generator heat exchanger 351 or pumping heat transfer fluid from the district return conduit 23 into the thermal energy generator heat exchanger 351, is made based on a local pressure difference between the district feed conduit 22 and district return conduit 23.

The thermal energy generator valve 352 and the thermal energy generator pump 353 may be arranged as separate devices. The thermal energy generator valve 352 and the thermal energy generator pump 353 may be arranged as a single device, in the summary section referred to as a flow regulator. The thermal energy generator valve 352 and the thermal energy generator pump 353 may be arranged in parallel, as illustrated in FIG. 4. The thermal energy generator valve 352 and the thermal energy generator pump 353 may be arranged in series. In this last embodiment wherein the thermal energy generator valve 352 and the thermal energy generator pump 353 is arranged in series the pump is arranged to be set in an inactive state allowing a flow of heat transfer fluid there through.

The thermal energy generator heat exchanger 351 is further connected to the district feed conduit 22 for allowing return of heat transfer fluid from the thermal energy generator heat exchanger 351 to the district feed conduit 22.

The second pressure difference determining device 354 is adapted to determine a second local pressure difference, Δpe, of the district thermal energy circuit 20. The second local pressure difference is preferably measured in the vicinity to where the thermal energy generator heat exchanger 351 is connected to the district thermal energy circuit 20. The second pressure difference determining device 354 may comprises a second hot conduit pressure determining device 354a and a second cold conduit pressure determining device 354b. The second hot conduit pressure determining device is arranged to be connected to the district feed conduit 22 for measuring a second local pressure of the heat transfer fluid of the district feed conduit 22. The second cold conduit pressure determining device 354b is arranged to be connected to the district return conduit 23 for measuring a second local pressure of the heat transfer fluid of the district return conduit 23. The second local pressure difference device 354 is arranged to determine the second local pressure difference as a pressure difference between the second local pressure of the heat transfer fluid of the district feed conduit 22 and the second local pressure of the heat transfer fluid of the district return conduit 23. Hence, the second local pressure difference may be defined as a local pressure difference between a second local pressure of the heat transfer fluid of the district feed conduit 22 and a second local pressure of the heat transfer fluid of the district return conduit 23. Preferably, the second local pressure of the heat transfer fluid of the district feed conduit 22 is measured in the vicinity to where the thermal energy generator heat exchanger 351 is connected to the district feed conduit 22. Preferably, the second local pressure of the heat transfer fluid of the district return conduit 23 is measured in the vicinity to where the thermal energy generator heat exchanger 351 is connected to the district return conduit 23.

The second pressure difference determining device 354 may be implemented as a hardware device, a software device, or as a combination thereof. The second pressure difference determining device 354 is arranged to communicate the second local pressure difference, $\Delta p_2$, to the second controller 355.

The second controller 355 may be implemented as a hardware controller, a software controller, or as a combination thereof. The second controller 355 is arranged to selectively control the use of either the thermal energy generator valve 352 or the thermal energy generator pump 353. The second controller 355 is arranged to perform the selective control based on the second local pressure difference provided by the second pressure difference determining device 354. The second controller 355 is arranged to communicate with the thermal energy generator valve 352 and the thermal energy generator pump 353 for controlling the thermal energy generator valve 352 and the thermal energy generator pump 353. The second controller 355 is arranged to selectively control the use of the thermal energy generator valve 352 when the second local pressure difference indicates that the second local pressure of the heat transfer fluid of the district return conduit 23 is larger than the second local pressure of the heat transfer fluid of the district feed conduit 22. The second controller 355 is arranged to selectively control the use of the thermal energy generator pump 353 when the second local pressure difference indicates that the second local pressure of the heat transfer fluid of the district return conduit 23 is lower than or equal to the second local pressure of the heat transfer fluid of the district feed conduit 22.

The thermal energy generator heat exchanger 351 is arranged to transfer thermal energy from its surroundings to heat transfer fluid. The heat transfer fluid returned to district feed conduit 22 has a temperature higher than the second temperature. Preferably, thermal energy generator heat exchanger 351 controlled such that the temperature of the heat transfer fluid returned to the district feed conduit 22 is equal to the first temperature.

Figure 4:
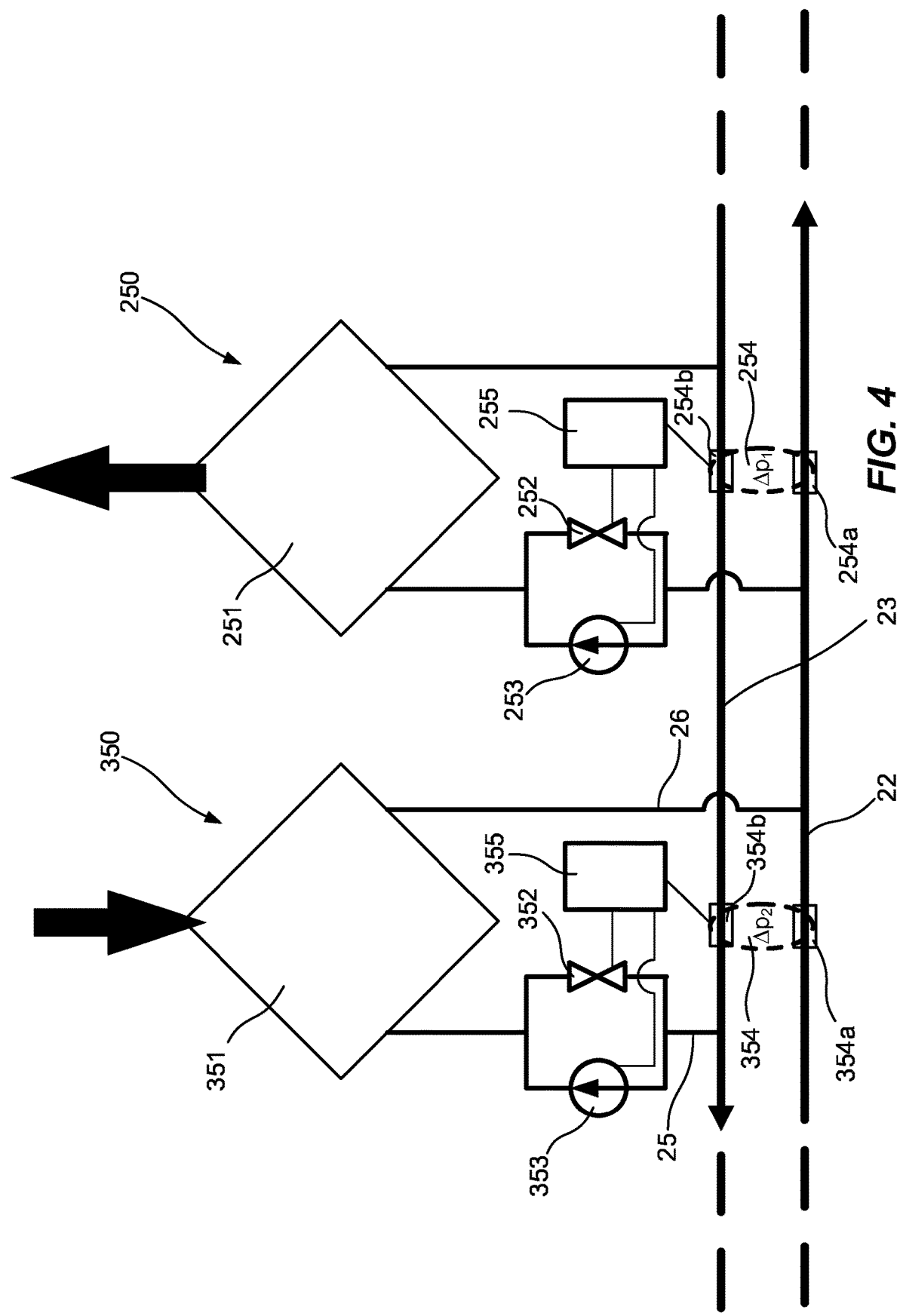
FIG. 4 is a schematic diagram of a local thermal energy consumer assembly and a local thermal energy generator assembly connected to a thermal energy circuit.

In the in FIG. 4 shown embodiment the first and second pressure difference determining devices 254; 354 are two physically different pressure difference determining devices. However, according to another embodiment one specific local thermal energy consumer assembly 250 and one specific local thermal energy generator assembly 350 may share the same pressure difference determining device. Hence, the first and second pressure difference determining devices 254; 354 may physically be the same pressure difference determining device. According to a further embodiment two specific local thermal energy consumer assemblies 250 may share the same pressure difference determining device. According to a yet another embodiment two specific local thermal energy generator assemblies 350 may share the same pressure difference determining device.

In the in FIG. 4 shown embodiment the first and second controllers 255; 355 are two physically different controllers. However, according to another embodiment one specific local thermal energy consumer assembly 250 and one specific local thermal energy generator assembly 350 may share the same controller. Hence, the first and second controller 255; 355 may physically be the same controller. According to a further embodiment two specific local thermal energy consumer assemblies 250 may share the same controller. According to a yet another embodiment two specific local thermal energy generator assemblies 350 may share the same controller.

Preferably, the demand to inhale or exhale heat using the thermal energy consumer heat exchangers 251 and the thermal energy generator heat exchangers 351 is made at a defined temperature difference. A temperature difference of 8-10° C. corresponds to optimal flows through the thermal energy consumer heat exchangers 251 and the thermal energy generator heat exchangers 351.

The local pressure difference between the district feed conduit 22 and the district return conduit 23 may vary along the district thermal energy circuit 20. Especially, the local pressure difference between the district feed conduit 22 and the district return conduit 23 may vary from positive to negative pressure difference seen from one of the district feed or return conduits, 22, 23. Hence, sometimes a specific local thermal energy consumer/generator assembly 250, 350 may need to pump heat transfer fluid through the corresponding thermal energy consumer/generator heat exchanger 251, 351 and sometimes the specific local thermal energy consumer/generator assembly 250, 350 may need to let heat transfer fluid flow through the corresponding thermal energy consumer/generator heat exchanger 251, 351. Accordingly, it will be possible to let all the pumping within the system to take place in the local thermal energy consumer/generator assemblies 250, 350. Due to the limited flows and pressures needed small frequency controlled circulation pumps may be used.

The thermal energy consumer pump 253 and/or the thermal energy generator pump 353 may for example be a frequency controlled circulation pump.

The thermal energy consumer valve 252 and/or the thermal energy generator valve 352 may be a regulation valve.

Figure 5:
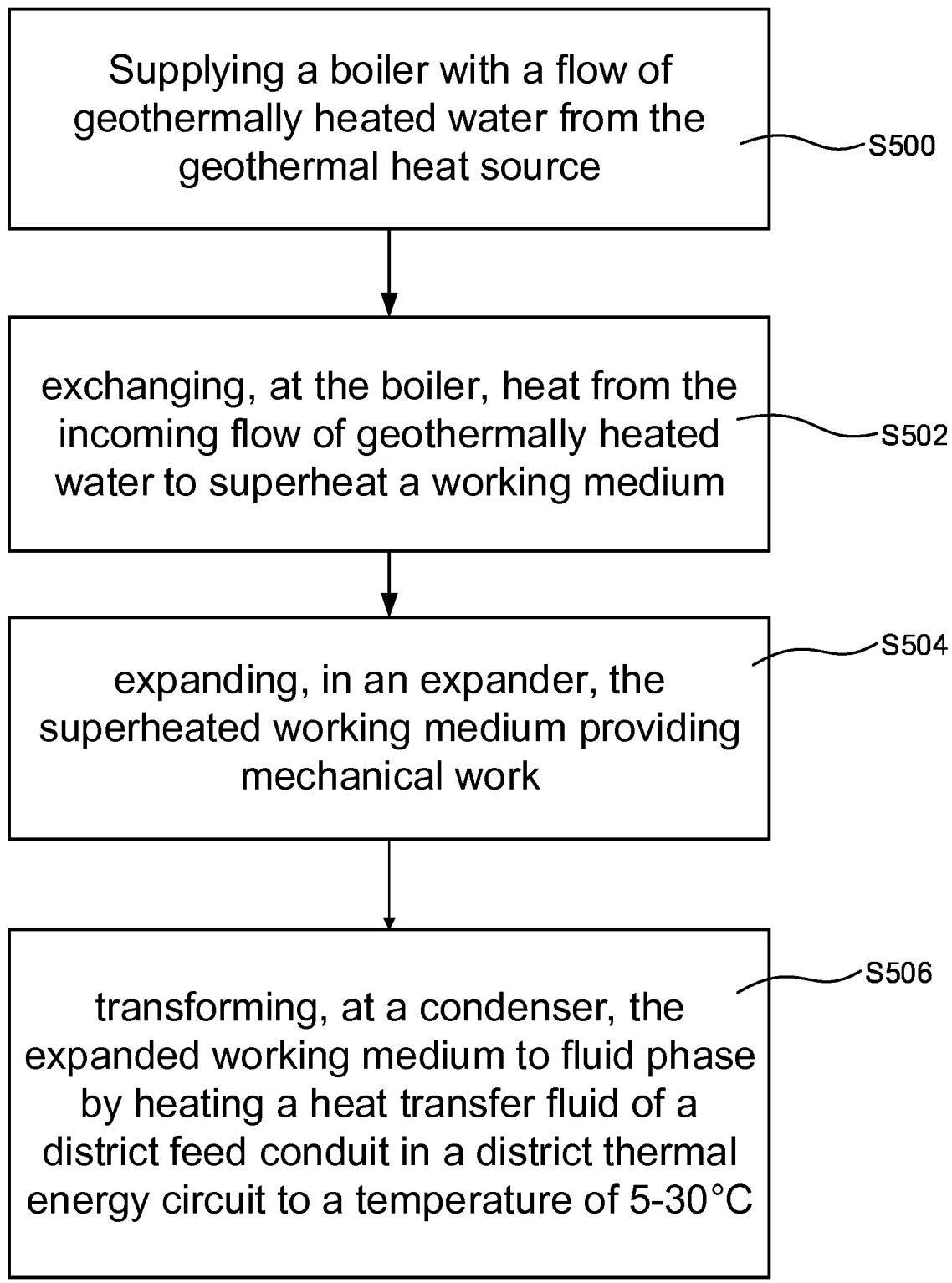
FIG. 5 is a block diagram of a method of providing mechanical work and heating heat transfer fluid of a district thermal energy circuit.

With reference to FIG. 5 a method of providing mechanical work and heating heat transfer fluid of a district thermal energy circuit 20 is disclosed. The method comprises one or more of the following acts. The acts may be performed in any order suitable.

Supplying S500 a flow of geothermally heated water from a geothermal heat source 10 to a boiler 51 which is connected to the geothermal heat source 10.

Exchanging S502 heat from the incoming flow of geothermally heated water to superheat a working medium. The heat is exchanged from the incoming flow of geothermally heated water by a heat exchanger 52a,52b, 52c of the boiler 51.

Expanding S504 the superheated working medium in an expander to thereby provide mechanical work. The mechanical work may be transferred to a generator to transform the mechanical work to electrical power. The electrical power may by way of example be supplied to the electrical grid.

Transforming, S506, at a condenser 55, the expanded working medium to liquid phase by heating a heat transfer fluid of a district feed conduit 22 in the district thermal energy circuit 20 to a temperature of 5-30° C.

The flow of local heat transfer fluid is circulated in the district thermal energy distributing system 20 via the district feed conduit 22 to local heating or cooling systems 200, 250, 300, 350 arranged in buildings 40 and then back to the condenser 55 via the district return conduit 23. The act of circulating is preferably performed using a plurality the local circulation pumps 28 or by a central circulation pump 27.

Heat may be extracted from the local heat transfer fluid flowing in the local feed conduit 22 at the local heating system 200, 250 in each of the plurality of buildings 40. The extracted heat may be used for providing hot tap water and/or comfort heating to the respective building 40. Also, heat may be extracted from one of the plurality of buildings 40 at a cooling system 300, 350.

The person skilled in the art realizes that the present invention by no means is limited to the preferred embodiments described above. On the contrary, many modifications and variations are possible within the scope of the appended claims.

Figure 3:
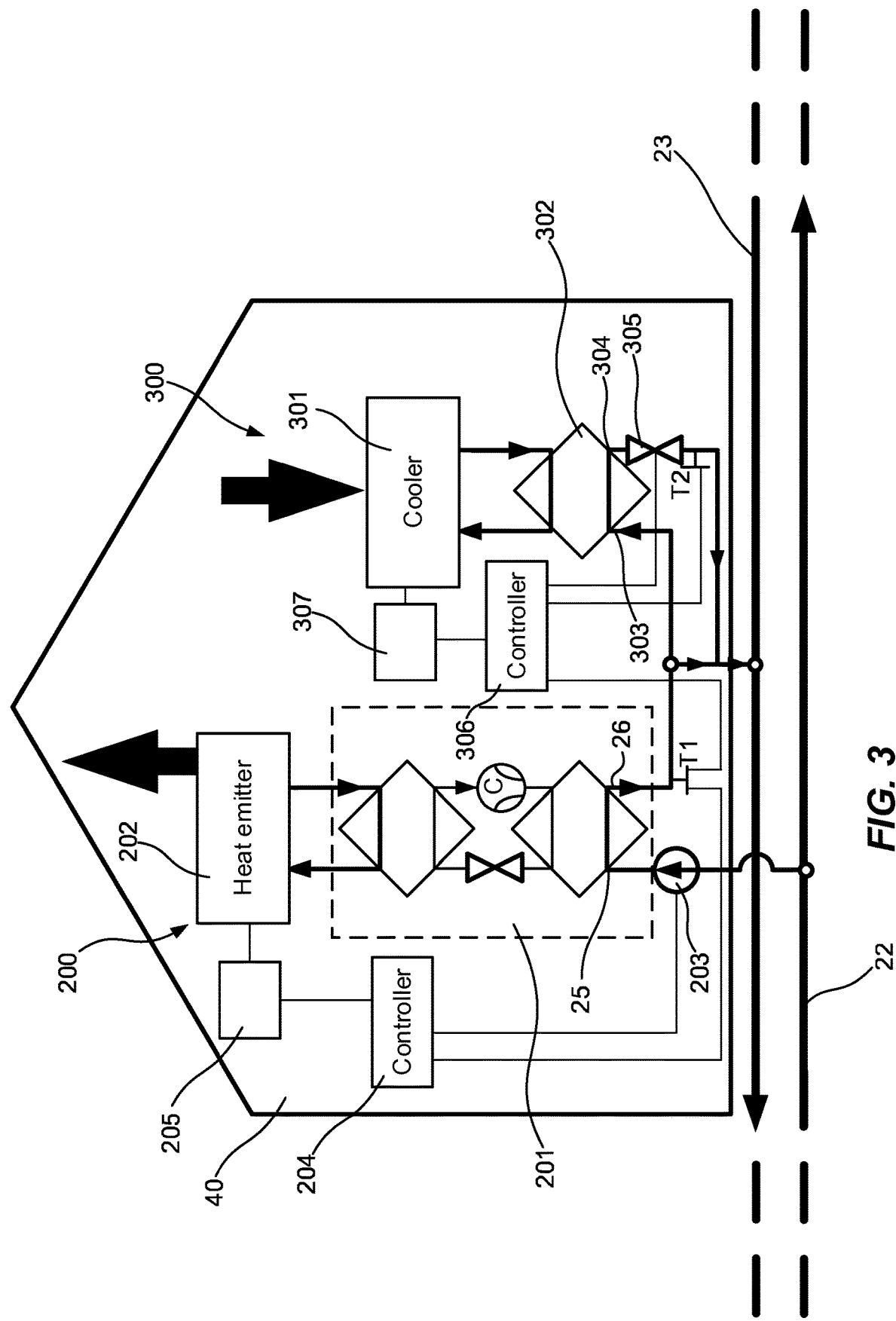
FIG. 3 is a schematic diagram of a combined heating and cooling system.

For example, in the in FIG. 3 shown embodiment the flow valve 305 is arranged in the outlet 304 of the cooling heat exchanger 302. However, the flow valve 305 may alternatively be arranged in the inlet 303 of the cooling heat exchanger 302.

In the in FIG. 3 shown embodiment, the first and second controllers 204, 306 are illustrated as separate controllers. However, alternatively the first and second controllers 204, 306 may be combined into a single controller.

In the in FIG. 1 shown embodiment the central circulation pump 27 is illustrated to be located at the inlet to the condenser 55. However, it is realized that the central circulation pump 27 may be arranged at any position within the district thermal energy circuit 20.

In the in FIG. 3 shown embodiment, the local heat transfer fluid exiting the local cooling system 300 via the outlet 304 of the cooling heat exchanger 302 is feed to the district return conduit 23. However, alternatively or in combination, the heat transfer fluid exiting the local cooling system 300 via the outlet 304 may be feed to the district feed conduit 22. Feeding of the heat transfer fluid exiting the local cooling system 300 via the outlet 304 may be controlled by the second controller 306. The control of the feeding of the heat transfer fluid exiting the local cooling system 300 via the outlet 304 to the district feed and/or return conduits 22, 23 may be based on the temperature monitored by the second sensor T2.

Further, the heating and cooling systems have been exemplified with one, respectively two temperature sensors T1 and T1-T2, respectively. It is to be understood that the number of temperature sensors and their positions may change. It is also to be understood that additional sensors may be introduced to the system depending on desired input to the first and second controllers 204, 306 and desired complexity. Especially, the first and second controllers 204, 306 may be arranged to communicate with the heat emitters 202 and/or coolers 301 locally arranged in the buildings 40 to take local settings into account.

Additionally, variations to the disclosed embodiments can be understood and effected by the skilled person in practicing the claimed invention, from a study of the drawings, the disclosure, and the appended claims.

The invention claimed is:

1. A district energy distributing system comprising:
a geothermal power plant comprising:
a first circuit comprising:
a feed conduit for an incoming flow of geothermally heated water from a geothermal heat source;
a boiler comprising a heat exchanger configured to exchange heat from the incoming flow of geothermally heated water to superheat a working medium of a second circuit of the geothermal power plant;
a return conduit for a return flow of cooled water from the boiler to the geothermal heat source;
wherein the second circuit comprises:
the boiler configured to superheat the working medium of the second circuit;
an expander connected to the boiler and configured to allow the superheated working medium to expand and to transform the expansion to mechanical work; and
a condenser configured to transform the expanded working medium to liquid phase and to heat a heat transfer fluid of a district thermal energy circuit;
wherein the district thermal energy circuit comprises:
a district feed conduit, and a district return conduit, wherein the district feed conduit is configured to allow the heat transfer fluid of a first temperature to flow there through, and wherein the district return conduit is configured to allow the heat transfer fluid of a second temperature to flow there through, wherein the second temperature is lower than the first temperature;
a plurality of local heating systems, each having an inlet connected to the district feed conduit and an outlet connected to the district return conduit, wherein each local heating system of the plurality of local heating systems is configured to provide hot water and/or comfort heating to a building, and wherein each of the local heating systems comprises:
a thermal energy consumer heat exchanger selectively connected to the district feed conduit via a thermal energy consumer valve for allowing the heat transfer fluid from the district feed conduit to flow into the thermal energy consumer heat exchanger, selectively connected to the district feed conduit via a thermal energy consumer pump for pumping the heat transfer fluid from the district feed conduit into the thermal energy consumer heat exchanger, and connected to the district return conduit for allowing return of the heat transfer fluid from the thermal energy consumer heat exchanger to the district return conduit, wherein the thermal energy consumer heat exchanger is arranged to transfer thermal energy from the heat transfer fluid to surroundings of the thermal energy consumer heat exchanger, such that the heat transfer fluid returned to the district return conduit has a temperature lower than the first temperature and preferably a temperature equal to the second temperature;

pressure difference determining hardware configured to determine a local pressure difference, $\Delta pl$, between the district feed conduit and the district return conduit; and a controller configured to, based on the local pressure difference, selectively control the thermal energy consumer valve to be open and the thermal energy consumer pump to be inactive in a first mode of operation and selectively control the thermal energy consumer valve to be closed and the thermal energy consumer pump to be active in a second mode of operation, wherein the first mode of operation and the second mode of operation are set based on the local pressure difference;

wherein the condenser is configured to heat the heat transfer fluid of the district feed conduit to a temperature of 5-30° C.

2. The district energy distributing system according to claim 1, wherein the geothermal heat source is a deep geothermal heat source.

3. The district energy distributing system according to claim 1, wherein the expander is a steam turbine.

4. The district energy distributing system according to claim 1, wherein the expander is configured to allow the superheated working medium to expand to receive an outgoing temperature of 10-40° C.

5. The district energy distributing system according to claim 1, wherein the boiler is configured to superheat the liquefied working medium from the condenser.

6. The district energy distributing system according to claim 1, wherein the geothermal power plant further comprises a generator configured to transform the mechanical work into electrical power.

7. The district energy distributing system according to claim 1, wherein the geothermal heat source is configured to geothermally heat the cooled water returned via the return conduit to a temperature of 100-250° C.

8. The district energy distributing system according to claim 1, wherein the first circuit further comprises a suction pump configured to draw the geothermally heated water from the geothermal heat source to the feed conduit, and pressurize the geothermally heated water such that it is in liquid phase in the feed conduit.

9. The district energy distributing system according to claim 1, wherein the boiler is configured to exchange heat from the incoming flow of geothermally heated water such that the cooled water in the return conduit has a temperature of 10-40° C.

10. The district energy distributing system according to claim 1, wherein the district feed conduit together with the district return conduit have a heat transfer coefficient greater than 2.5 W/(mK) when arranged in parallel in the ground.

11. The district energy distributing system according to claim 1,
wherein the controller is configured to selectively use the thermal energy consumer valve when the local pressure difference indicates that a local pressure of the heat transfer fluid of the district feed conduit is larger than a local pressure of the heat transfer fluid of the district return conduit, wherein the controller is configured to selectively use the thermal energy consumer pump when the local pressure difference indicates that the local pressure of the heat transfer fluid of the district feed conduit is lower than or equal to the local pressure of the heat transfer fluid of the district return conduit.

12. The district energy distributing system according to claim 1, wherein the district feed conduit and district return conduit are dimensioned for pressures up to 0.6 MPa, 1 MPa, or 1.6 MPa.

13. The district energy distributing system according to claim 1, wherein each of the plurality of local heating systems is configured to extract heat from the heat transfer fluid entering via the inlet and return the thereafter cooled heat transfer fluid to the district return conduit via the outlet, wherein each of the plurality of local heating systems is configured to return local heat transfer fluid having a temperature in the range of 5 to 15° C.

* * * * *